United States Patent
Chen

(10) Patent No.: US 11,961,327 B2
(45) Date of Patent: Apr. 16, 2024

(54) IMAGE PROCESSING METHOD AND DEVICE, CLASSIFIER TRAINING METHOD, AND READABLE STORAGE MEDIUM

(71) Applicant: BOE Technology Group Co., Ltd., Beijing (CN)

(72) Inventor: Guannan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 424 days.

(21) Appl. No.: 17/294,478

(22) PCT Filed: Aug. 25, 2020

(86) PCT No.: PCT/CN2020/110945
§ 371 (c)(1),
(2) Date: May 17, 2021

(87) PCT Pub. No.: WO2021/043023
PCT Pub. Date: Mar. 11, 2021

(65) Prior Publication Data
US 2022/0019775 A1    Jan. 20, 2022

(30) Foreign Application Priority Data

Sep. 2, 2019   (CN) .......................... 201910823693.7

(51) Int. Cl.
*G06V 40/16*    (2022.01)
*G06F 18/21*    (2023.01)
(Continued)

(52) U.S. Cl.
CPC ............ *G06V 40/174* (2022.01); *G06F 18/21* (2023.01); *G06N 5/01* (2023.01); *G06N 20/20* (2019.01); *G06V 40/168* (2022.01)

(58) Field of Classification Search
CPC .. G06V 40/174; G06V 40/168; G06V 40/172; G06V 10/449; G06F 18/21;
(Continued)

(56) References Cited

U.S. PATENT DOCUMENTS

2021/0133434 A1    5/2021    Chen et al.

FOREIGN PATENT DOCUMENTS

| CN | 102831447 A | 12/2012 |
| CN | 104376333 A | 2/2015 |

(Continued)

OTHER PUBLICATIONS

Ghosal, Vidyut, Paras Tikmani, and Phalguni Gupta. "Face classification using Gabor wavelets and random forest." In 2009 Canadian Conference on Computer and Robot Vision, pp. 68-73. IEEE, 2009. (Year: 2009).*

(Continued)

*Primary Examiner* — Bobbak Safaipour
*Assistant Examiner* — Wassim Mahrouka
(74) *Attorney, Agent, or Firm* — WHDA, LLP

(57) ABSTRACT

An image processing method, an image processing device, a training method and a computer-readable storage medium. The image processing method includes: extracting a characteristic vector in an image to be recognized; based on the characteristic vector of the image to be recognized, acquiring a predicted score value of the image to be recognized; and based on the predicted score value, determining a category of an image information of the image to be recognized; wherein the image to be recognized is a face image, and the image information is a facial expression.

16 Claims, 9 Drawing Sheets

(51) Int. Cl.
 *G06N 5/01* (2023.01)
 *G06N 20/20* (2019.01)
(58) Field of Classification Search
 CPC .......... G06N 5/01; G06N 20/20; G06N 20/10;
 G06N 3/04
 See application file for complete search history.

(56) References Cited

FOREIGN PATENT DOCUMENTS

| | | | | |
|---|---|---|---|---|
| CN | 104680141 | A | | 6/2015 |
| CN | 104766041 | A | | 7/2015 |
| CN | 105469080 | A | | 4/2016 |
| CN | 106780434 | A | | 5/2017 |
| CN | 107832740 | A | * | 3/2018 ......... G06K 9/00302 |
| CN | 107832740 | A | | 3/2018 |
| CN | 107895154 | A | | 4/2018 |
| CN | 107895154 | A | * | 4/2018 ......... G06K 9/00268 |
| CN | 107977630 | A | | 5/2018 |
| CN | 108388890 | A | | 8/2018 |
| CN | 109034546 | A | | 12/2018 |
| CN | 109753938 | A | | 5/2019 |
| CN | 109767261 | A | | 5/2019 |
| CN | 109858958 | A | | 6/2019 |
| CN | 110532971 | A | | 12/2019 |
| CN | 111507149 | A | | 8/2020 |

OTHER PUBLICATIONS

Ou, Jun, Xiao-Bo Bai, Yun Pei, Liang Ma, and Wei Liu. "Automatic facial expression recognition using Gabor filter and expression analysis." In 2010 second international conference on computer modeling and simulation, vol. 2, pp. 215-218. IEEE, 2010. (Year: 2010).*
Chill Woo (The English Translation of Korean Patent Document KR-101702878-B1) (Year: 2017).*
"Statistical report and demonstration", compiled by the compilation group of the post knowledge training textbook for National Statisticians, Beijing: China Statistics Publishing, 2016, with English translation, cited in CN Office Action dated Apr. 6, 2022. (15 pages).
Office Action dated Apr. 6, 2022, issued in counterpart CN application No. 201910823693.7, with English machine translation. (40 pages).
Chang, Wei-Yi et al., "FATAUVA-Net: An Integrated Deep Learning Framework for Facial Attribute Recognition, Action Unit Detection, and Valence-Arousal Estimation", CVPR, 2017. (9 pages).
"Facial expression recognition research based on random forests.", Changchun University of Technology Master Degree Thesis, with English Machine Translation. (91 pages).
Arriaga, Octavio et al., "Real-time Convolutional Neural Networks for Emotion and Gender Classification". (5 pages).
Office Action dated Aug. 30, 2021 and Search Report dated Aug. 24, 2021, issued in counterpart CN Application No. 201910823693.7, with English Machine Translation. (21 pages).

* cited by examiner

IMAGE PROCESSING METHOD AND DEVICE, CLASSIFIER TRAINING METHOD, AND READABLE STORAGE MEDIUM

CROSS REFERENCE TO RELEVANT APPLICATIONS

The present application claims the priority of the Chinese patent application filed on Sep. 2, 2019 with the application number of CN201910823693.7, the disclosure of which is incorporated herein in its entirety by reference.

TECHNICAL FIELD

The embodiments of the present disclosure relate to an image processing method, an image processing device, a training method of a random-forest classifier and a computer-readable storage medium.

BACKGROUND

The technique of human-face-feature recognition is a hot-pot technique of biological pattern recognition in recent years. The technique of human-face-feature recognition requires to detect and locate the face feature points of a human face, and, according to those feature points, perform actions such as human-face matching and facial-expression analysis. In recent years, many research institutions and enterprises have invested a large amount of resource in the field of object identification, and obtained many achievements, which have been extensively applied in industries such as security and protection, finance and entertainment.

SUMMARY

At least an embodiment of the present disclosure provides an image processing method, comprising: extracting a characteristic vector in an image to be recognized; based on the characteristic vector of the image to be recognized, acquiring a predicted score value of the image to be recognized; and based on the predicted score value, determining a category of an image information of the image to be recognized; wherein the image to be recognized is a face image, and the image information is a facial expression.

For example, in an embodiment, the step of extracting the characteristic vector in the image to be recognized comprises: by using a Gabor filter, acquiring an image-feature response diagram of the image to be recognized; and extracting the characteristic vector of the image to be recognized from the image-feature response diagram; wherein the Gabor filter comprises a first quantity of dimensions and a second quantity of directions; the image-feature response diagram comprises features of the image information of the image to be recognized; and the first quantity of dimensions are less than 4 dimensions.

In an embodiment, the method further comprises, according to an accuracy rate of recognition of the image information by the Gabor filter with a third quantity of dimensions and a fourth quantity of directions, selecting the first quantity of dimensions and the second quantity of directions of the Gabor filter; wherein the first quantity of dimensions are 2 dimensions, and the second quantity of directions are 3 directions.

In an embodiment, the step of, based on the characteristic vector of the image to be recognized, acquiring the predicted score value of the image to be recognized comprises: by using a random-forest classifier, based on the characteristic vector of the image to be recognized, acquiring the predicted score value of the image to be recognized.

In an embodiment, the image processing method further comprises: based on characteristic vectors and grading values of image data in a training set comprised in a dataset, training the random-forest classifier; wherein the dataset comprises the plurality of image data, and each of the image data is marked with a grading value; the grading value of each of the image data is determined according to a category of image information comprised in the each of the image data, and different categories of the image information correspond to different grading values; the image data are face-image data; and the training set comprises a fifth quantity of the image data in the dataset.

In an embodiment, the step of, based on the characteristic vectors and the grading values of the image data in the training set, training the random-forest classifier comprises: by using a K-fold cross-validation mode, training the random-forest classifier; wherein K is an integer greater than 0.

In an embodiment, the image processing method further comprises: based on characteristic vectors and grading values of image data in a test set comprised in the dataset, checking the random-forest classifier that has been trained; wherein the test set comprises a sixth quantity of the image data; and the fifth quantity is greater than the sixth quantity.

In an embodiment, the categories of the image information include disgust, anger, calmness, delight and astonishment; wherein the disgust corresponds to a grading value of 10-19, the anger corresponds to a grading value of 20-29, the calmness corresponds to a grading value of 30-39, the delight corresponds to a grading value of 40-49, and the astonishment corresponds to a grading value of 50-59.

In an embodiment, the step of, based on the predicted score value, determining the category of the image information of the image to be recognized comprises: determining a threshold interval that the predicted score value of the image to be recognized falls into; and according to the threshold interval that the predicted score value of the image to be recognized falls into, determining the category of the image information of the image to be recognized.

At least an embodiment of the present disclosure further provides an image processing device, comprising: a processor; and a memory, wherein the memory stores one or more computer instructions, and the one or more computer instructions, when executed by the processor, causes the processor to perform operations of:

extracting a characteristic vector in an image to be recognized;

based on the characteristic vector of the image to be recognized, acquiring a predicted score value of the image to be recognized; and based on the predicted score value, determining a category of an image information of the image to be recognized;

wherein the image to be recognized is a face image, and the image information is a facial expression.

At least an embodiment of the present disclosure further provides a training method of a random-forest classifier, comprising: based on characteristic vectors and grading values of image data in a training set comprised in a dataset, training the random-forest classifier; wherein the dataset comprises the plurality of image data, and each of the image data is marked with a grading value; the grading value of each of the image data is determined according to a category of image information comprised in the each of the image data, and different categories of the image information correspond to different grading values; the image data are face-image data, and the image information is a facial expression; and the training set comprises a fifth quantity of the image data in the dataset.

In an embodiment, the step of, based on the characteristic vectors and the grading values of the image data in the training set, training the random-forest classifier comprises: by using a K-fold cross-validation mode, training the random-forest classifier; wherein K represents K parts that the image data in the training set are divided into, and K is an integer greater than 0.

In an embodiment, the training method further comprises: based on characteristic vectors and grading values of image data in a test set comprised in the dataset, checking the random-forest classifier that has been trained; wherein the test set comprises a sixth quantity of image data in the dataset; and the fifth quantity is greater than the sixth quantity.

In an embodiment, the categories of the image information include disgust, anger, calmness, delight and astonishment; wherein the disgust corresponds to a grading value of 10-19, the anger corresponds to a grading value of 20-29, the calmness corresponds to a grading value of 30-39, the delight corresponds to a grading value of 40-49, and the astonishment corresponds to a grading value of 50-59.

At least an embodiment of the present disclosure further provides a nonvolatile computer-readable storage medium, wherein the computer-readable storage medium stores a computer-readable instruction, and the computer-readable instruction, when executed by a computer, causes the computer to implement the image processing method according to any one of the embodiments of the present disclosure.

BRIEF DESCRIPTION OF THE DRAWINGS

In order to more clearly illustrate the technical solutions of the embodiments of the present disclosure, the figures of the embodiments will be briefly introduced below. Apparently, the figures that are described below merely involve some embodiments of the present disclosure, rather than limiting the present disclosure.

DETAILED DESCRIPTION

Figure 1:
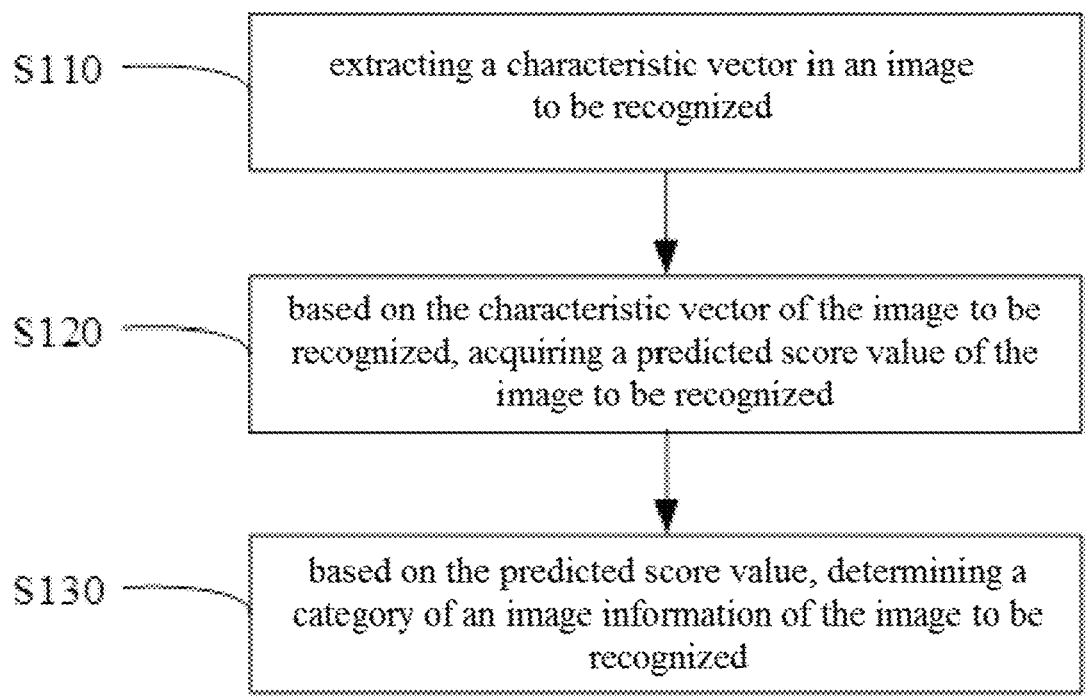
FIG. 1 is a flow chart of an example of the image processing method according to at least an embodiment of the present disclosure.

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the described embodiments of the present disclosure without paying creative work fall within the protection scope of the present disclosure.

Unless defined otherwise, the technical terminologies or scientific terminologies used in the present disclosure should have the meanings generally understood by a person skilled in the art of the present disclosure. The words used herein such as "first" and "second" do not indicate any sequence, quantity or importance, but are merely intended to distinguish different components. Likewise, the words such as "a", "an" or "the" do not indicate quantitative limitations, but indicate the existence of at least one instance. The words such as "comprise" or "include" mean that the element or article preceding the word encompasses the elements or articles and the equivalents thereof that are listed subsequent to the word, but do not exclude other elements or articles. The words such as "connect" or "couple" are not limited to physical or mechanical connections, but may include electric connections, regardless of direct connections or indirect connections. The words such as "upper", "lower", "left" and "right" are merely intended to indicate relative positions, and if the absolute position of the described item has changed, the relative positions might also be correspondingly changed.

Facial-expression recognition is extension of the technical field of human-face-feature recognition, and is a difficult point in the art. Currently, there are many types of facial-expression-recognition algorithms based on machine learning and deep learning. However, most of the algorithms, in order to ensure the accuracy of the test data, have a complicated algorithm structure and a long operation time, and thus cannot perform real-time facial-expression recognition on terminal product devices so far, especially product devices based on ARM development board. In some applications, for example, when the human-face feature is extracted by using an Active Shape Model and a random-forest classifier is used for facial-expression classification, because the Active Shape Model is an analytical method based on geometric features, when the dimensions and the angles of the human face are changing, obvious feature errors will be generated, which results in that the accuracy of the result of the facial-expression classification is low. When the facial-expression recognition is performed by using a deep convolution network of a single-branch structure in a scene of real-time facial-expression recognition, the accuracy of the result of the facial-expression recognition is also low. When a face-movement-unit encoding and detecting layer and a valence-arousal estimating layer are added based on the deep convolution network, although the accuracy of the facial-expression recognition of the network is high, because the network is bulky, video facial-expressions cannot be identified in real time.

Aiming at the above problems, at least an embodiment of the present disclosure provides an image processing method. The image processing method comprises extracting a characteristic vector in an image to be recognized; based on the characteristic vector of the image to be recognized, acquiring a predicted score value of the image to be recognized; and based on the predicted score value, determining a category of an image information of the image to be recognized; wherein the image to be recognized is a face image, and the image information is a facial expression.

Some embodiments of the present disclosure further provide an image processing device, a training method and a computer-readable storage medium that correspond to the image processing method stated above.

The image processing method according to the above embodiments of the present disclosure can perform facial-expression recognition in real time with a high accuracy rate, and has a low algorithm complexity, which improves the robustness of the algorithm.

The embodiments and the examples thereof of the present disclosure will be described in detail below with reference to the drawings.

At least an embodiment of the present disclosure provides an image processing method. FIG. 1 is a flow chart of an example of the image processing method. The image processing method may be implemented by software, hardware, firmware or any combination thereof, and be loaded and executed by a processor in a device such as a mobile phone, a notebook computer, a desktop computer, a network server and a digital camera, to realize the facial-expression recognition of a face image. The image processing method according to at least an embodiment of the present disclosure will be described below with reference to FIG. 1. As shown in FIG. 1, the image processing method comprises a step S110 to a step S130.

Step S110: extracting a characteristic vector in an image to be recognized.

Step S120: based on the characteristic vector of the image to be recognized, acquiring a predicted score value of the image to be recognized.

Step S130: based on the predicted score value, determining a category of an image information of the image to be recognized.

For example, the image to be recognized is a face image. For example, the face image may be a human-face image shown in FIG. 2 or a face image not shown, for example, a face image of an animal, and the case in which the face image is a human-face image will be used below as an example for the description, which is not limited in the embodiments of the present disclosure.

Figure 2:
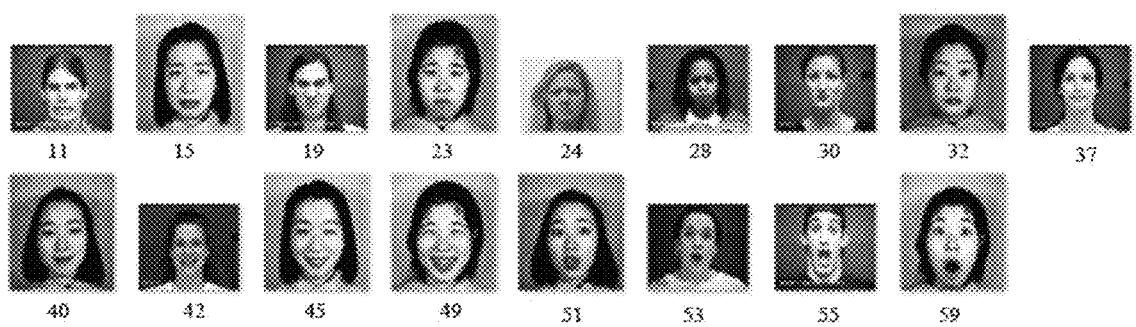
FIG. 2 is a schematic diagram of the marking of the facial expressions with the grading values according to at least an embodiment of the present disclosure.

For example, the image information of the image to be recognized is a facial expression. For example, as shown in FIG. 2, the categories of the facial expressions may include disgust, anger, calmness, delight, astonishment and so on, which is not limited in the embodiments of the present disclosure.

Regarding the step S110, for example, in some examples, a Gabor filter and a feature extracting method in the art may be used to extract the characteristic vector.

For example, a two-dimensional Gabor basis function can excellently describe the receptive-field characteristics of a pair of simple visual neurons in the primary visual system of mammal. With the development of wavelet transform and neurophysiology, the Gabor transformation has gradually evolved into the form of two-dimensional Gabor wavelet. The Gabor filter has a high robustness for the changing of the brightness and the contrast of an image and the changing of the gesture of a human face, and it expresses the local feature that is most useful for human-face recognition. Therefore, it is extensively applied in computer vision and texture analysis. Therefore, in the example, before the extraction of the characteristic vector, firstly the Gabor filter acquires the image-feature response diagram of the image to be recognized, and then the characteristic vector of the image to be recognized is extracted from the image-feature response diagram, which can improve the accuracy of the facial-expression recognition.

For example, in some examples, the function of the Gabor filter may be expressed as:

$$g(x, y; \lambda, \theta, \phi, \sigma, \gamma) = e^{-\frac{1}{2}\left[\left(\frac{x'}{\sigma}\right)^2 + \left(\frac{\gamma y'}{\sigma}\right)^2\right]} e^{i\left(\left(\frac{2\pi * x'}{\lambda}\right) + \phi\right)}$$

wherein x represents the horizontal coordinate in the Gabor filter of the pixels of the image to be recognized, and y represents the vertical coordinate in the Gabor filter of the pixels of the image to be recognized; $\lambda$ represents the wavelength of the Gabor filter, and is greater than or equal to 2 and less than or equal to one fifth of the image to be recognized; $\theta$ represents the direction of the Gabor filter, and its value is 0 to $2\pi$; $\phi$ represents the phase deviation, and its value ranges from $-\pi$ to $\pi$; $\gamma$ represents the length-width ratio, and decides the ellipticity of the function shape of the Gabor filter, wherein when $\gamma=1$, the function shape of the Gabor filter is a circle, when $\gamma<1$, the function shape of the Gabor filter is lengthened in the direction of the parallel strips, and, for example, the value of $\gamma$ may be 0.5; and $\sigma$ represents the standard deviation of the Gaussian factor of the function of the Gabor filter.

Figure 3:
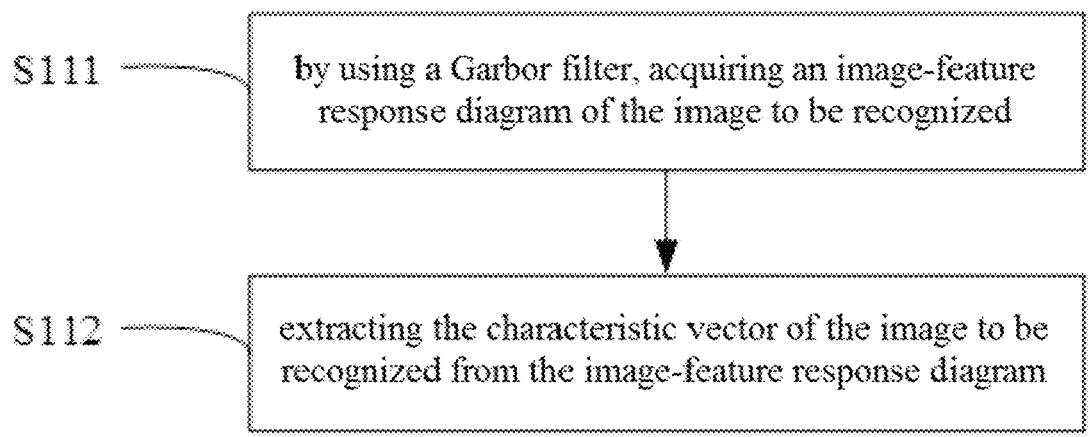
FIG. 3 is a flow chart of the process of extracting a characteristic vector according to at least an embodiment of the present disclosure.

FIG. 3 is a flow chart of the process of extracting a characteristic vector according to at least an embodiment of the present disclosure. In other words, FIG. 3 is a flow chart of at least an example of the step S110 shown in FIG. 1. For example, in the example shown in FIG. 3, the process of extracting the characteristic vector comprises a step S111 to a step S112. The process of extracting the characteristic vector will be introduced in detail below with reference to the step S111 to the step S112.

Step S111: by using a Gabor filter, acquiring an image-feature response diagram of the image to be recognized.

For example, the Gabor filter comprises a first quantity of dimensions and a second quantity of directions. For example, in some examples, the first quantity of dimensions are less than 4 dimensions, for example, 2 dimensions, and the second quantity of directions are 3 directions.

For example, the image-feature response diagram comprises features of the image information of the image to be recognized.

For example, this step may comprise, according to an accuracy rate of recognition of the image information by the Gabor filter with a third quantity of dimensions and a fourth quantity of directions, selecting the first quantity of dimensions and the second quantity of directions of the Gabor filter. For example, in some examples, the third quantity of dimensions are 5 dimensions, and the fourth quantity of directions are 8 directions.

It should be noted that the first quantity, the second quantity, the third quantity and the fourth quantity may be determined according to actual situation, which is not limited in the embodiments of the present disclosure.

Figure 4:
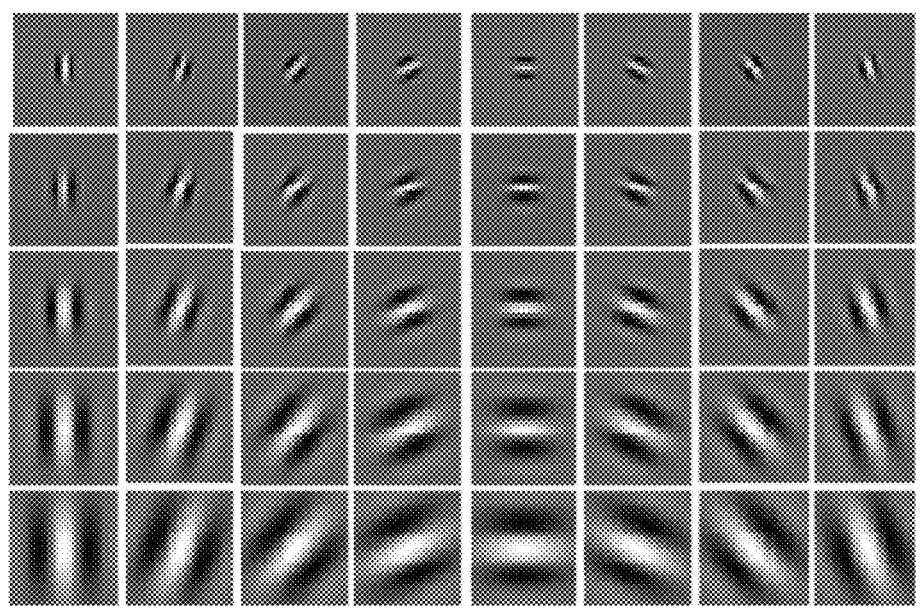
FIG. 4 shows a schematic diagram of a feature response diagram of a filter bank comprising 40 filters of 5 dimensions and 8 directions.

FIG. 4 shows a schematic diagram of an image-feature response diagram of a filter bank comprising 40 filters of 5 dimensions and 8 directions. For example, by describing the human-face image shown in FIG. 5 by using the filter bank shown in FIG. 4, the human-face-feature response diagram shown in FIG. 6 may be obtained. For example, when the filter bank comprises totally 40 filters of 5 dimensions and 8 directions, because the Gabor filter bank outputs 40 frames for one frame of image, the feature data volume is large, and therefore it is required to select and simplify the feature data, for example, simplifying to outputting merely the human-face-feature response diagram acquired by totally 6 filters of 2 dimensions and 3 directions.

Figure 5:
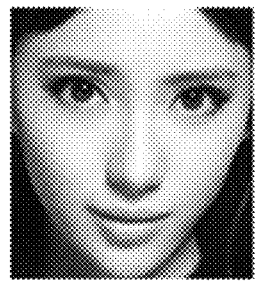
FIG. 5 is a schematic diagram of a human-face image.
Figure 6:
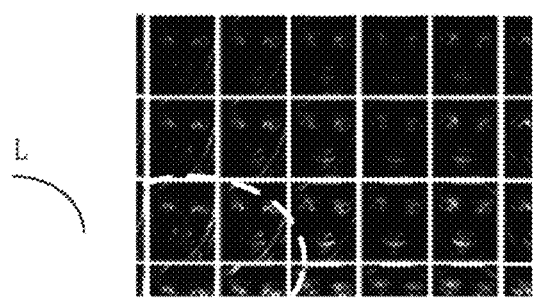
FIG. 6 is a schematic diagram of the human-face-feature response diagram according to at least an embodiment of the present disclosure.

It will be described in detail below with reference to FIGS. 4-6 how to, according to an accuracy rate of recognition of the image information by the Gabor filter with a third quantity of dimensions and a fourth quantity of directions, select the first quantity of dimensions and the second quantity of directions of the Gabor filter. The case in which the first quantity of dimensions are 2 dimensions, the second quantity of directions are 3 directions, the third quantity of dimensions are 5 dimensions and the fourth quantity of directions are 8 directions is used below as an example for the description, which is not limited in the embodiments of the present disclosure.

In the embodiments of the present disclosure, for example, in some examples, the Gabor filter may be used in combination with a support vector machine (SVM) algorithm or another machine learning algorithm in the art, to analyze the human-face facial-expression data (jaffe database), to acquire the contributions on the result of the facial-expression analysis by filters of different dimensions or directions. It should be noted that the design and the principle of the support vector machine may refer to relevant introduction in the art, and are not discussed here further.

For example, the contributions on the result of the facial-expression analysis by filters of different dimensions and different directions are shown in Tables 1 and 2:

TABLE 1

Accuracy rates of facial-expression analysis of filters of different dimensions

| Dimension | 24 × 24 | 33 × 33 | 48 × 48 | 67 × 67 | 96 × 96 |
|---|---|---|---|---|---|
| Accuracy rate | 86% | 87% | 91% | 95% | 87% |

TABLE 2

Accuracy rates of facial-expression analysis of filters of different directions

| Direction | 0 | $\pi/8$ | $2\pi/8$ | $3\pi/8$ | $4\pi/8$ | $5\pi/8$ | $6\pi/8$ | $7\pi/8$ |
|---|---|---|---|---|---|---|---|---|
| Accuracy rate | 92% | 92% | 89% | 87% | 78% | 76% | 87% | 86% |

It can be seen according to the above analysis result that the contributions on the accuracy rate of the facial-expression recognition by the Gabor filters of the dimensions of 48×48 and 67×67 and the directions of 0, $\pi/8$ and $2\pi/8$ are higher. Therefore, the corresponding 2 dimensions (48×48 and 67×67) and 3 directions (0, $\pi/8$ and $2\pi/8$) may be selected from the filter bank of totally 40 filters of 5 dimensions and 8 directions, and the outputs of the totally 6 filters (for example, the filter bank L shown in FIG. 6) may be inputted as the human-face-feature response diagram into the subsequent algorithm. Therefore, that can reduce the data processing quantity while ensuring the accuracy rate, to improve the efficiency of the image processing.

Step S112: extracting the characteristic vector of the image to be recognized from the image-feature response diagram.

For example, the characteristic vector in the image to be recognized may be extracted by using the feature extracting methods in the art such as HOG feature extraction, Harr wavelet transform and neural network, which is not discussed here further, which is not limited in the embodiments of the present disclosure.

For example, the step may comprise providing a feature extracting unit, and extracting the characteristic vector in the image to be recognized by using the feature extracting unit. For example, the feature extracting unit may be implemented as a central processing unit (CPU), an image processor (GPU), a tensor processing unit (TPU), a field-programmable gate array (FPGA) or a processing unit in another form having a data handling capacity and/or an instruction executing capacity and a corresponding computer instruction. For example, the processing unit may be a generic processor or a dedicated processor, may be a processor based on the X86 or ARM architecture, and so on.

Regarding the step S120, for example, this step may comprise, by using a random-forest classifier, based on the characteristic vector of the image to be recognized, acquiring the predicted score value of the image to be recognized.

Figure 7:
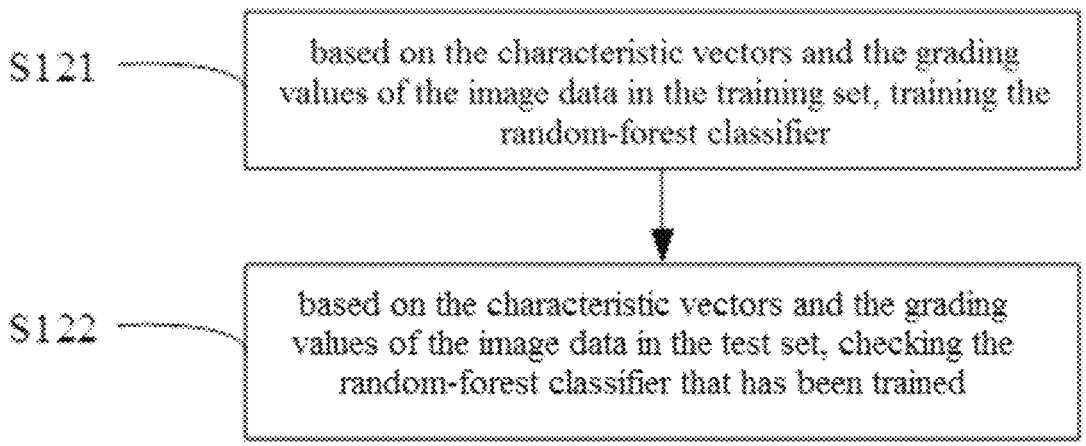
FIG. 7 is a flow chart of the process of training a random-forest classifier according to at least an embodiment of the present disclosure.

FIG. 7 is a flow chart of the process of training a random-forest classifier according to at least an embodiment of the present disclosure. As shown in FIG. 7, in some examples, the training process comprises a step S121, and, in other examples, the training process further comprises a step S122. The process of training the random-forest classifier will be described briefly below with reference to FIG. 7.

Step S121: based on the characteristic vectors and the grading values of the image data in the training set, training the random-forest classifier.

For example, the dataset used for training the random-forest classifier comprises a training set and a test set. For example, the dataset comprises the plurality of image data, and each of the image data is marked with a grading value, the grading value of each of the image data is determined according to a category of image information comprised in the each of the image data, and different categories of the image information correspond to different grading values.

For example, the training set comprises a fifth quantity of the image data in the dataset, for example, comprising 70% of the image data in the dataset.

For example, as shown in FIG. 2, the categories of the image information (i.e., the facial expression) include disgust, anger, calmness, delight, astonishment and so on. For example, in some examples, the disgust corresponds to a grading value of 10-19, the anger corresponds to a grading value of 20-29, the calmness corresponds to a grading value of 30-39, the delight corresponds to a grading value of 40-49, and the astonishment corresponds to a grading value of 50-59. It should be noted that the grading values are merely illustrative, which is not limited in the embodiments of the present disclosure. For example, taking the facial-expression of disgust as an example for the description, in the interval 10-19, the grading value of the facial-expression of "most disgusting" is 10, which may, according to the reduction of the degree of disgust, progressively increased to 19. The grading values of the other facial-expressions are similar to that, and are not discussed here further.

For example, in the process of the changing of the facial-expressions of a human face from negative to positive, the changing of the spatial features of the eyes and the mouth, which have the highest influence on the facial-expression, is continuous to a certain extent. For example, in some examples, the category of the facial expression may be determined according to the position coordinates of the sites such as the eyes or the mouth. For example, taking the mouth as an example, when the coordinate of the mouth corners is lower than the coordinate of a middle position, the facial expression of the human-face image is a negative facial expression (for example, disgust and anger). For example, when the coordinate of the mouth corners is lowest, the facial expression is disgust, with the grading value of 10, and as the mouth corners are lifting, the grading value is sequentially increased. When the coordinate of the mouth corners is higher than the coordinate of the middle position, the facial expression of the human-face image is a positive facial expression (for example, delight and astonishment). The particular grading values may be determined according to the degree of the changing of the mouth corners, which is not discussed here further.

For example, in some examples, the marking of the grading value of each of the image data may be realized by, for example, naming according to the grading values, as shown in FIG. 2, which is not limited in the embodiments of the present disclosure.

For example, in the training process, the characteristic vectors extracted from the outputs of the above totally 6 filters (for example, the filter bank L shown in FIG. 6) of the 2 dimensions (48×48 and 67×67) and 3 directions (0, π/8 and 2π/8) corresponding to the image data in the training set are used as the input, and the grading values of the facial expressions corresponding to the image data are inputted as truth values, to train the random-forest classifier.

For example, in the training process, the random-forest classifier is trained by using a K-fold cross-validation mode (K is an integer greater than 0). The K-fold cross validation refers to, in the training process, randomly dividing the image data in the training set into K parts, using one of the K parts for testing, and using the remaining K−1 parts for training, to assess the accuracy of the model training. For example, in some examples, a 5-fold cross-validation mode may be used to train the random-forest classifier. It should be noted that the particular training process may refer to the training process of the random-forest classifiers in the art, which is not discussed here further.

In the present embodiment, by associating the spatial change of the eyes and the mouth with the grading values, the spatial changes of the different human-face facial expressions and the grading values are corresponded one to one, and, accordingly, the conventional issue of facial-expression classification is converted into an issue of the regression of a facial-expression spatial-change distribution function. In the regression, the facial-expression changing feature is the definitional-domain variable, the grading value is the value-region variable, and by performing function fitting to such a series of features, the function obtained by the fitting can be used to predict and score an unknown facial-expression. That can overcome to a certain extent the problem of disordered marking of the facial-expression categories caused by individual subjective cognition, which facilitates improving the robustness of the algorithm.

Step S122: based on the characteristic vectors and the grading values of the image data in the test set, checking the random-forest classifier that has been trained.

For example, when the mathematical model of the random-forest classifier is obtained by the training of the step S121, the step may comprise, based on the test set, checking the accuracy of its prediction, and correcting the parameter matrix in its mathematical model, to increase the accuracy of the prediction. The particular checking method may refer to conventional methods in the art, and is not discussed here further. For example, the test set comprises a sixth quantity of the image data, and each of the image data is marked with a grading value, the grading value of each of the image data is determined according to a category of image information comprised in the each of the image data, and different categories of the image information correspond to different grading values. It should be noted that the method of determining each of the sixth quantity of image data in the test set and its grading value is similar to that of the training set, and is not discussed here further.

For example, from the dataset (comprising a training set and a test set), 30% of the image data (for example, a sixth quantity of the image data) are extracted to be used as the test set, to prevent over-fitting of the model caused by too many image data in the training set, and under-fitting of the model caused by too little image data in the training set.

For example, the step may comprise providing a predicting unit, and acquiring the predicted score value of the image to be recognized based on the characteristic vector of the image to be recognized by using the predicting unit. For example, the predicting unit may be implemented as a central processing unit (CPU), an image processor (GPU), a tensor processing unit (TPU), a field-programmable gate array (FPGA) or a processing unit in another form having a data handling capacity and/or an instruction executing capacity and a corresponding computer instruction.

Regarding the step S130, by inputting the image to be recognized, performing feature extraction, and inputting the extracted characteristic vector into the random-forest classifier for prediction, the predicted score value y is obtained. In order to obtain the prediction of the actual facial-expression classification, the threshold intervals corresponding to the categories of the facial expressions may be set according to practical experience, to be used as the basis for determining facial-expression classification.

For example, in some examples, the threshold intervals are set as follows:

When the predicted score value is less than 26, the category of the facial expression is disgust; when the predicted score value is less than or equal to 32 and greater than 26, the category of the facial expression is anger; when the predicted score value is less than or equal to 36 and greater than 32, the category of the facial expression is calmness; when the predicted score value is less than or equal to 47 and greater than 36, the category of the facial expression is delight; and when the predicted score value is greater than 47, the category of the facial expression is astonishment.

It should be noted that the preset values of the threshold intervals may be adjusted according to actual situation, which is not limited in the embodiments of the present disclosure.

Figure 8:
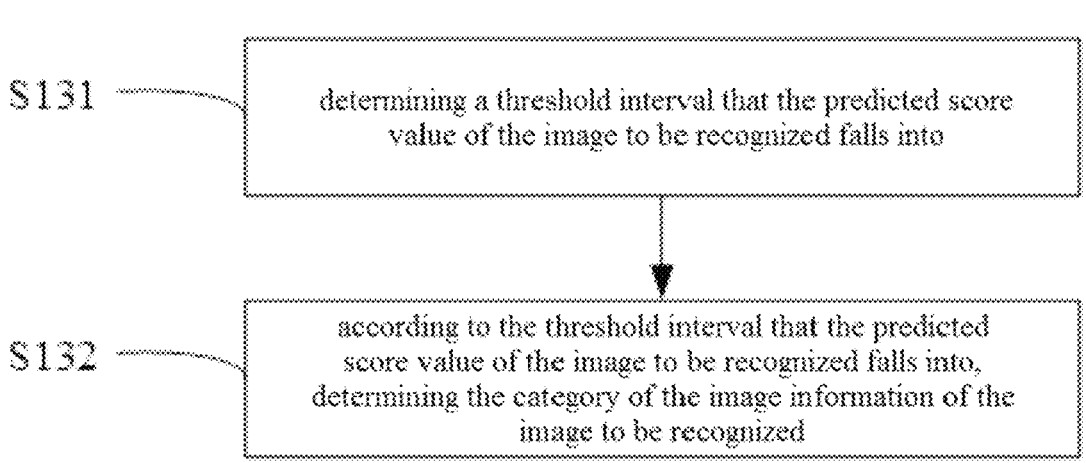
FIG. 8 is a flow chart of the determination of the category of the image information according to at least an embodiment of the present disclosure.

FIG. 8 is a flow chart of the determination of the category of the image information according to at least an embodiment of the present disclosure. In other words, FIG. 8 is a flow chart of at least an example of the step S130 shown in FIG. 1. As shown in FIG. 8, the process of determining the category of the image information comprises a step S131 and a step S132. The process of determining the category of the image information will be introduced in detail below with reference to the step S131 to the step S132.

Step S131: determining a threshold interval that the predicted score value of the image to be recognized falls into.

For example, if the predicted score value outputted by the random-forest classifier is 30, then it falls into the threshold interval 26-32 in the above-described threshold intervals. It should be noted that different threshold intervals may be determined according to different predicted score values, which is not limited in the embodiments of the present disclosure.

Step S132: according to the threshold interval that the predicted score value of the image to be recognized falls into, determining the category of the image information of the image to be recognized.

For example, according to the threshold interval 26-32 determined in the step S131, it can be determined that the category of the image information of the image to be recognized is anger. It should be noted that different categories of the image information may be determined according to different threshold intervals, which is not limited in the embodiments of the present disclosure.

For example, the step may comprise providing a recognizing unit, and determining the category of the image information of the image to be recognized based on the predicted score value by using the recognizing unit. For example, the recognizing unit may be implemented as a central processing unit (CPU), an image processor (GPU), a tensor processing unit (TPU), a field-programmable gate array (FPGA) or a processing unit in another form having a data handling capacity and/or an instruction executing capacity and a corresponding computer instruction.

It should be noted that, in the embodiments of the present disclosure, the process of the image processing method may comprise more or less operations, which operations may be sequentially performed or concurrently performed. Although the process of the image processing method stated above comprises multiple operations that are performed in a particular sequence, it should be clearly known that the sequence of the multiple operations is not limited. The image processing method stated above may be performed once, and may also be performed multiple times according to a predetermined condition.

The image processing method according to the embodiments of the present disclosure, by the combination of the Gabor filter and the random-forest classifier, can obtain a high speed of image processing and a high accuracy rate, and can perform facial-expression recognition to face images in real time. Furthermore, the algorithm has a low complexity, and has a good robustness in practical environments. moreover, the algorithm may be written by using for example C++, has a high execution speed, and is easily transplantable, and it merely requires to spend 15 ms in processing a frame of 150×150 face image on a ARM development board (for example, RK3399), and thus can realize real-time facial-expression analysis of multiple human faces in a video condition.

Figure 9:
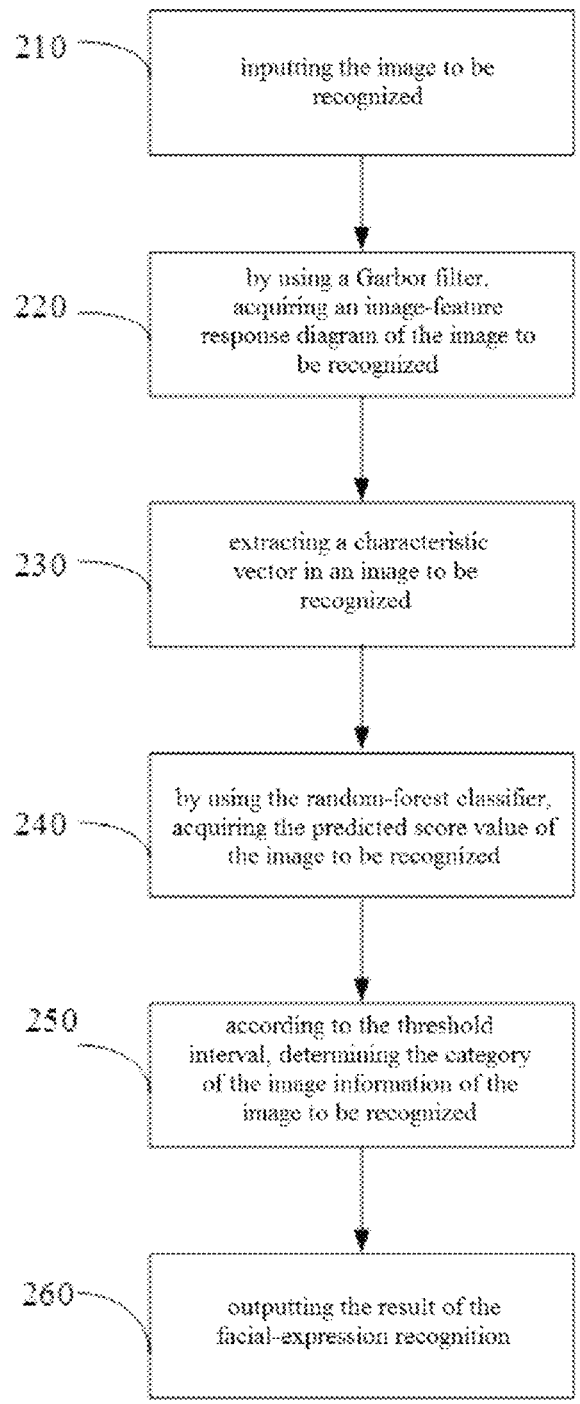
FIG. 9 is a flow chart of the image processing method according to at least an embodiment of the present disclosure.

FIG. 9 is a flow chart of the image processing method according to at least an embodiment of the present disclosure. As shown in FIG. 9, the image processing method comprises a step S210 to a step S260. The image processing method according to at least an embodiment of the present disclosure will be introduced below with reference to the step S210 to the step S260.

Step S210: inputting the image to be recognized.

For example, the image to be recognized is a face image.

Step S220: by using a Gabor filter, acquiring an image-feature response diagram of the image to be recognized.

For example, in some examples, in order to reduce the data processing quantity, merely the human-face-feature response diagram of, for example, totally 6 filters (for example, the filter bank L shown in FIG. 6) of 2 dimensions (48×48 and 67×67) and 3 directions (0, π/8 and 2π/8) is selected from the human-face-feature response diagram outputted by totally 40 filters of 5 dimensions and 8 directions. The particular introduction may refer to the above relevant description on the step S111, and is not discussed here further.

Step S230: extracting a characteristic vector in an image to be recognized.

For example, the characteristic vector in the image to be recognized in the human-face-feature response diagram obtained in the step S220 may be extracted by using the feature extracting methods in the art such as HOG feature extraction, Harr wavelet transform and neural network, and be used as the input of the random-forest classifier, which is not discussed here further, which is not limited in the embodiments of the present disclosure.

Step S240: by using the random-forest classifier, acquiring the predicted score value of the image to be recognized.

For example, according to the mathematical model of the random-forest classifier obtained by the training, the predicted score value of the image to be recognized is acquired.

It should be noted that the particular process of training the random-forest classifier may refer to the above relevant description on the step S122 and the step S122, and is not discussed here further.

Step S250: according to the threshold interval, determining the category of the image information of the image to be recognized.

For example, in some examples, the threshold intervals are set as follows:

When the predicted score value is less than 26, the category of the facial expression is disgust; when the predicted score value is less than or equal to 32 and greater than 26, the category of the facial expression is anger; when the predicted score value is less than or equal to 36 and greater than 32, the category of the facial expression is calmness; when the predicted score value is less than or equal to 47 and greater than 36, the category of the facial expression is delight; and when the predicted score value is greater than 47, the category of the facial expression is astonishment.

For example, this step may comprise determining a threshold interval that the predicted score value of the image to be recognized falls into, and according to the threshold interval that the predicted score value of the image to be recognized falls into, determining the category of the image information of the image to be recognized.

Step S260: outputting the result of the facial-expression recognition.

For example, the result of the facial-expression recognition is outputted to a corresponding apparatus, for usage and reference.

The image processing method according to the embodiments of the present disclosure, by the combination of the Gabor filter and the random-forest classifier, can obtain a high operation speed and a high accuracy rate of the image processing method, and can perform facial-expression recognition to face images in real time. Furthermore, the algorithm has a low complexity, and has a good robustness in practical applications.

Figure 10A:
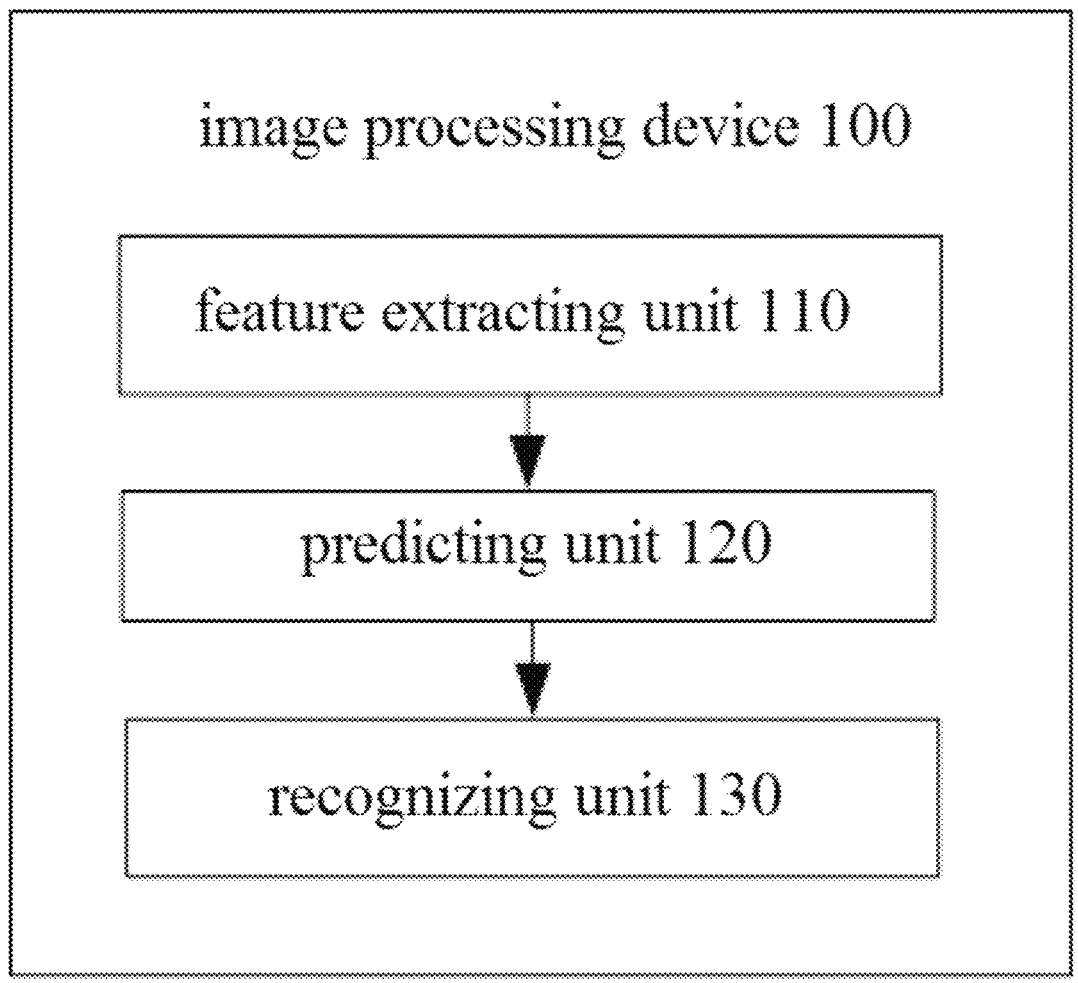
FIG. 10A is a schematic block diagram of the image processing device according to at least an embodiment of the present disclosure.

FIG. 10A is a schematic block diagram of the image processing device according to at least an embodiment of the present disclosure. For example, in the example shown in FIG. 10A, the image processing device 100 comprises a feature extracting unit 110, a predicting unit 120 and a recognizing unit 130. For example, those units may be implemented as a hardware (for example, an electric circuit) module or a software module and so on. For example, those units may be implemented as a central processing unit (CPU), an image processor (GPU), a tensor processing unit (TPU), a field-programmable gate array (FPGA) or a processing unit in another form having a data handling capacity and/or an instruction executing capacity and a corresponding computer instruction.

The feature extracting unit 110 is configured for extracting a characteristic vector in an image to be recognized. For example, the image to be recognized is a face image. For example, the feature extracting unit 110 may implement the step S110, and the particular implementation method may refer to the relevant description on the step S110, and is not discussed here further.

The predicting unit 120 is configured for, based on the characteristic vector of the image to be recognized, acquiring a predicted score value of the image to be recognized. For example, the predicting unit 120 may implement the step S120, and the particular implementation method may refer to the relevant description on the step S120, and is not discussed here further.

The recognizing unit 130 is configured for, based on the predicted score value, determining a category of an image information of the image to be recognized. For example, the image information is a facial expression. For example, the recognizing unit 130 may implement the step S130, and the particular implementation method may refer to the relevant description on the step S130, and is not discussed here further.

Figure 10B:
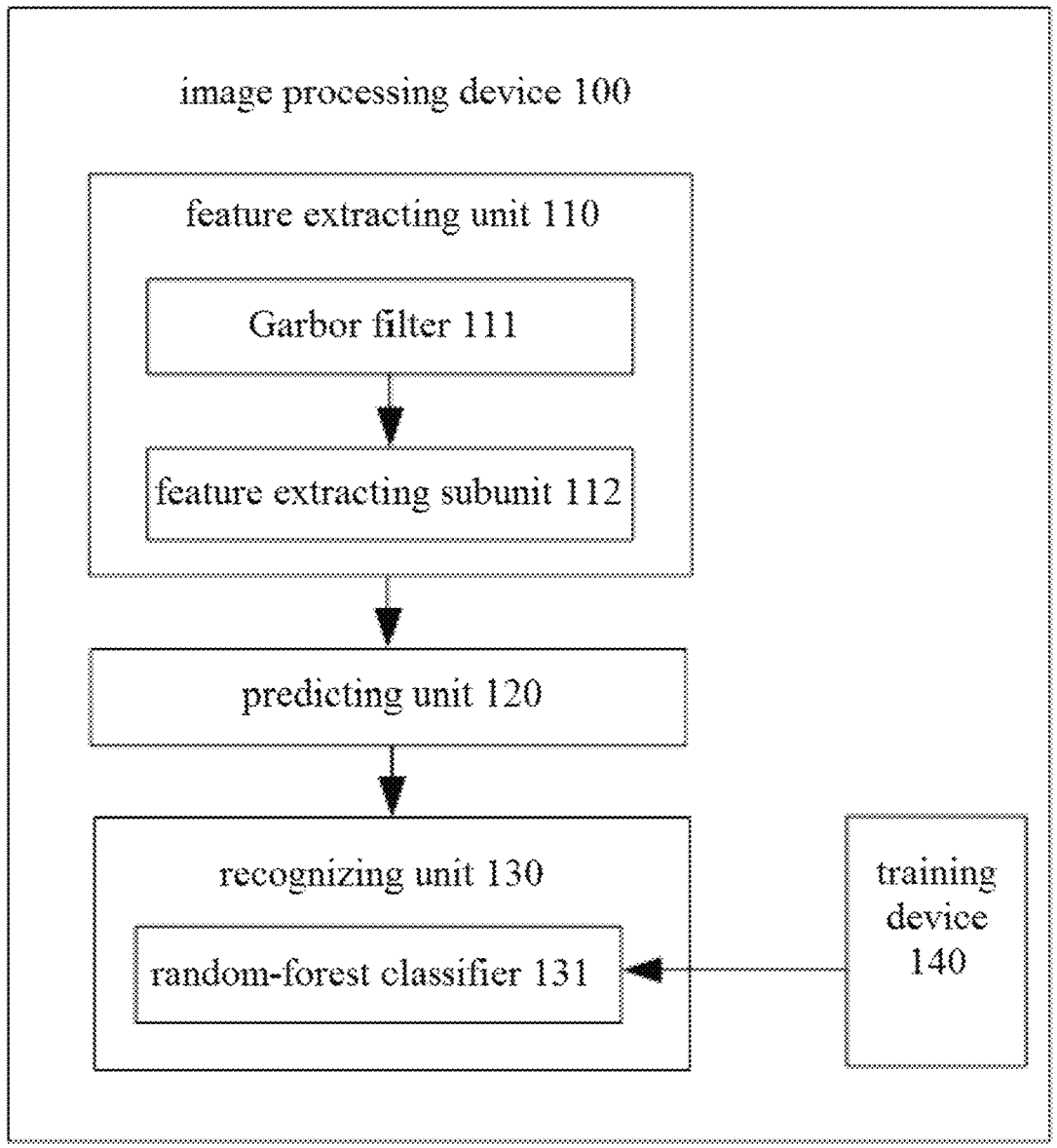
FIG. 10B is a schematic block diagram of the image processing device according to at least an embodiment of the present disclosure.

FIG. 10B is a schematic block diagram of the image processing device according to at least an embodiment of the present disclosure. For example, as shown in FIG. 10B, in some examples, the feature extracting unit 110 further comprises a Gabor filter 111 and a feature extracting subunit 112.

For example, the Gabor filter 111 is configured for acquiring an image-feature response diagram of the image to be recognized. For example, the Gabor filter comprises 2 dimensions and 3 directions; in other words, the Gabor filter merely outputs the image-feature response diagram acquired by filters of 2 dimensions and 3 directions, and the image-feature response diagram comprises features of the image information of the image to be recognized. For example, the Gabor filter 111 may implement the step S111, and the particular implementation method may refer to the relevant description on the step S111, and is not discussed here further.

For example, the feature extracting subunit 112 is configured for extracting the characteristic vector of the image to be recognized from the image-feature response diagram. For example, the feature extracting subunit 112 may implement the step S112, and the particular implementation method may refer to the relevant description on the step S112, and is not discussed here further.

For example, as shown in FIG. 10B, in some examples, the recognizing unit 130 comprises a random-forest classifier 131. For example, the random-forest classifier 131 is configured for, based on the characteristic vector of the image to be recognized, acquiring a predicted score value of the image to be recognized. The particular implementation method may refer to the relevant description on the step S130, and is not discussed here further.

For example, as shown in FIG. 10B, in some examples, the image processing device 100 further comprises a training device 140. The training device 140 is configured for, based on the characteristic vectors and the grading values of the image data in the training set, training the random-forest classifier 131. For example, the training set comprises a fifth quantity of the image data, and each of the image data is marked with a grading value, the grading value of each of the image data is determined according to a category of image information comprised in the each of the image data, and different categories of the image information correspond to different grading values. For example, the training device 140 may realize the step S121, and the particular implementation method may refer to the relevant description on the step S121, and is not discussed here further.

It should be noted that the embodiments of the present disclosure may comprise more or less electric circuits or units, and the connection relations between the electric circuits or units are not limited, and may be determined according to practical demands. The particular modes of the formation of the electric circuits are not limited, and they may be formed by analog devices according to circuit principle, formed by digital chips, or formed in another suitable manner.

Figure 11:
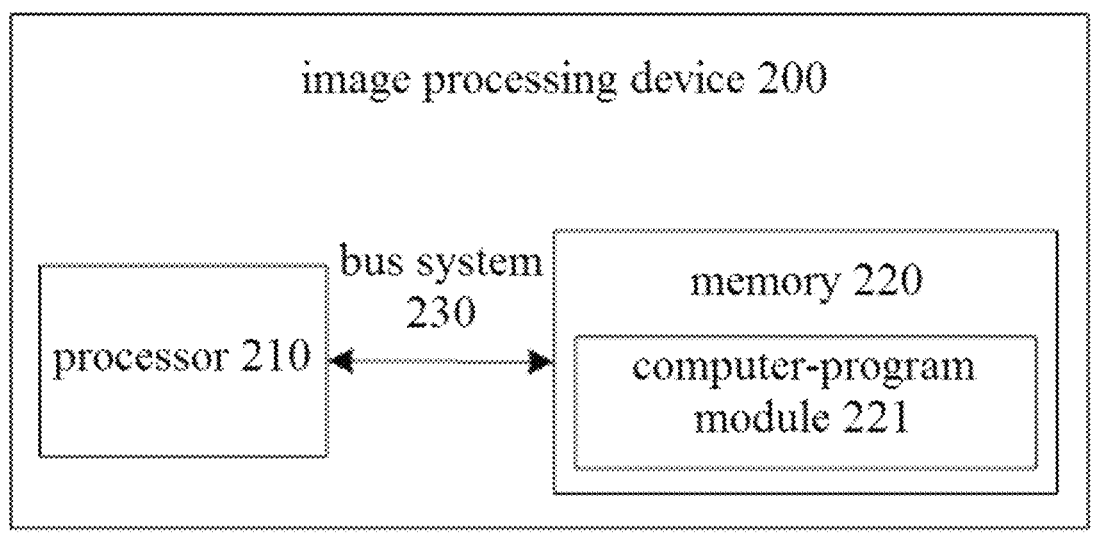
FIG. 11 is a schematic block diagram of the image processing device according to at least an embodiment of the present disclosure.

FIG. 11 is a schematic block diagram of the image processing device according to at least an embodiment of the present disclosure. As shown in FIG. 11, the image processing device 200 comprises a processor 210 and a memory 220, and the memory 220 stores one or more computer-program modules 221.

For example, the processor 210 is connected to the memory 220 via a bus system 230. For example, the one or more computer-program modules 221 are stored in the memory 220. For example, the one or more computer-program modules 221 comprise an instruction for implementing the image processing method according to any one of the embodiments of the present disclosure. For example, the instruction in the one or more computer-program modules 221 may be executed by the processor 210. For example, the bus system 230 may be a commonly used serial or parallel communication bus and so on, which is not limited in the embodiments of the present disclosure.

For example, the processor 210 may be a central processing unit (CPU), an image processor (GPU) or a processing unit in another form having a data handling capacity and/or an instruction executing capacity, may be a generic processor or a dedicated processor, and may control the other components in the image processing device 200 to perform the desired functions.

The memory 220 may comprise one or more computer program products. The computer program products may include various types of computer-readable storage mediums, for example, a volatile memory and/or a nonvolatile memory. The volatile memory may include, for example, a random access memory (RAM) and/or a cache and so on. The nonvolatile memory may include, for example, a read-only memory (ROM), a hard disk, a flash memory and so on. The computer-readable storage mediums may store one or more computer program instructions, and the processor 210 may execute the program instructions, to realize the functions in the embodiments of the present disclosure (realized by the processor 210) and/or other desired functions, for example, the image processing method. The computer-readable storage mediums may further store various application programs and various data, for example, the various data used and/or generated by the characteristic vector and the application programs.

It should be noted that, for the clarity and the concision of the description, the embodiments of the present disclosure do not give all of the component units of the image processing device 200. In order to realize the necessary functions of the image processing device 200, a person skilled in the art may provide and set the component units not shown according to particular demands, which is not limited in the embodiments of the present disclosure.

The technical effects of the image processing device 100 and the image processing device 200 according to different embodiments may refer to the technical effects of the image processing method according to the embodiments of the present disclosure, and are not discussed herein further.

The image processing device 100 and the image processing device 200 may be used for various suitable electronic devices. For example, the electronic devices may further comprise an image collecting apparatus, an input/output (I/O) apparatus, a peripheral interface or a communication apparatus and so on. For example, the image collecting apparatus 100/200 may comprise an imaging sensor and a lens, wherein the imaging sensor may be of the CMOS type or the CCD type, and the lens comprises one or more lenses (convex lenses or concave lenses and so on). The input/output apparatus is, for example, a display, a touchpad, a touch screen, a keyboard and a mouse. The peripheral interface may be various types of interfaces, for example, a USB interface and a lighting interface. The communication apparatus may communicate via wireless communication with a network and other devices. The network is, for example, the Internet, an intranet, a wireless network such as a cell-phone network, a wireless local area network (LAN) and/or a metropolitan area network (MAN). The wireless communication may employ any one of various communication standards, protocols and techniques, including but not limited to the Global System for Mobile communication (GSM), Enhanced Data GSM Environment (EDGE), Wideband Code Division Multiple Access (W-CDMA), Code Division Multiple Access (CDMA), Time Division Multiple Access (TDMA), Bluetooth, Wi-Fi (for example, based on the IEEE 802. 11a, IEEE 802. 11b, IEEE 802. 11g and/or IEEE 802. 11n standards), Voice over Internet Phone (VoIP), Wi-MAX, protocols used for E-mail, instant messaging and/or Short Messaging Service (SMS), and any other suitable communication protocols.

For example, the electronic device may be any device such as a mobile phone, a tablet personal computer, a notebook computer, an e-book, a game machine, a television set, a digital photo frame and a navigator, and may also be a combination of any electronic devices and hardware, which is not limited in the embodiments of the present disclosure.

At least an embodiment of the present disclosure further provides a training method of a random-forest classifier. The training method comprises: based on the characteristic vectors and the grading values of the image data in the training set, training the random-forest classifier. For example, the training set comprises a fifth quantity of the image data, and each of the image data is marked with a grading value, the grading value of each of the image data is determined according to a category of image information comprised in the each of the image data, and different categories of the image information correspond to different grading values. For example, the image data are face-image data, and the image information is a facial expression. For example, the categories of the image information include disgust, anger, calmness, delight and astonishment; wherein the disgust corresponds to a grading value of 10-19, the anger corresponds to a grading value of 20-29, the calmness corresponds to a grading value of 30-39, the delight corresponds to a grading value of 40-49, and the astonishment corresponds to a grading value of 50-59. The particular introduction of the training method may refer to the above relevant description on the step S121 and the step S122, and is not discussed here further.

Figure 12:
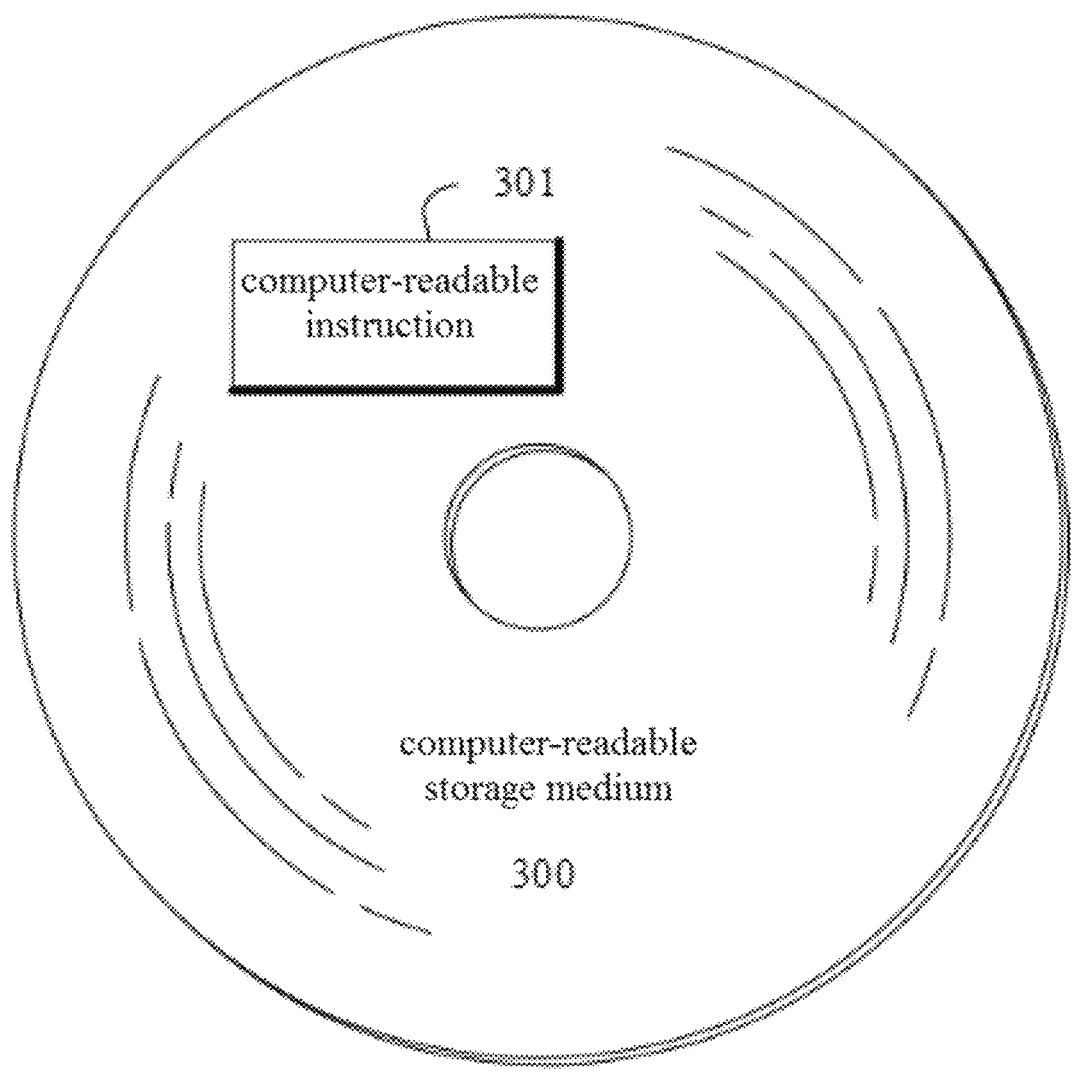
FIG. 12 is a schematic diagram of the computer-readable storage medium according to at least an embodiment of the present disclosure.

At least an embodiment of the present disclosure further provides a computer-readable storage medium. FIG. 12 is a schematic diagram of the nonvolatile computer-readable storage medium according to at least an embodiment of the present disclosure. For example, as shown in FIG. 12, the nonvolatile computer-readable storage medium 300 stores a computer-readable instruction 301, and the computer-readable instruction, when executed by a computer (comprising a processor), may implement the image processing method according to any one of the embodiments of the present disclosure or the training method according to any one of the embodiments of the present disclosure.

For example, the computer-readable storage medium may be any combination of one or more computer-readable storage mediums; for example, one of the computer-readable storage mediums contains a computer-readable program code for extracting a characteristic vector in an image to be recognized, and another computer-readable storage medium contains a computer-readable program code for, based on the characteristic vector of the image to be recognized, acquiring a predicted score value of the image to be recognized. For example, when the program code is read by a computer, the computer may execute the program code stored in the computer storage medium, to implement, for example, the image processing method or the training method according to any one of the embodiments of the present disclosure.

For example, the computer-readable storage medium may include a memory card of a smart phone, a storage component of a tablet personal computer, a hard disk of a personal computer, a random access memory (RAM), a read-only memory (ROM), an erasable programmable read-only memory (EPROM), a compact disc read-only memory (CD-ROM) and a flash memory, or any combination of the above computer-readable storage mediums, and may also be other suitable computer-readable storage mediums.

It should be noted that:

(1) The drawings of the embodiments of the present disclosure merely relate to the structures involved in the embodiments of the present disclosure, and the other structures may refer to common designs.

(2) Subject to the avoiding of any conflict, the embodiments and the features of the embodiments of the present disclosure may be combined to obtain new embodiments.

The above are merely illustrative embodiments of the present disclosure, and are not intended to limit the protection scope of the present disclosure. The protection scope of the present disclosure is determined by the appended claims.

The invention claimed is:

1. An image processing method, comprising:
extracting a characteristic vector in an image to be recognized;

based on the characteristic vector of the image to be recognized, acquiring a predicted score value of the image to be recognized; and
based on the predicted score value, determining a category of an image information of the image to be recognized;
wherein the image to be recognized is a face image, and the image information is a facial expression;
wherein the step of, based on the characteristic vector of the image to be recognized, acquiring the predicted score value of the image to be recognized comprises:
by using a random-forest classifier, based on the characteristic vector of the image to be recognized, acquiring the predicted score value of the image to be recognized; and
the method further comprises:
based on characteristic vectors and grading values of image data in a training set comprised in a dataset, training the random-forest classifier;
wherein the dataset comprises the plurality of image data, and each of the image data is marked with a grading value;
the grading value of each of the image data is determined according to a category of image information comprised in the each of the image data, and different categories of the image information correspond to different grading values;
the image data are face-image data; and
the training set comprises a fifth quantity of the image data in the dataset.

2. The image processing method according to claim 1, wherein the step of extracting the characteristic vector in the image to be recognized comprises:
by using a Gabor filter, acquiring an image-feature response diagram of the image to be recognized; and
extracting the characteristic vector of the image to be recognized from the image-feature response diagram;
wherein the Gabor filter comprises a first quantity of dimensions and a second quantity of directions;
the image-feature response diagram comprises features of the image information of the image to be recognized; and
the first quantity of dimensions are less than 4 dimensions.

3. The image processing method according to claim 2, wherein the method further comprises, according to an accuracy rate of recognition of the image information by the Gabor filter with a third quantity of dimensions and a fourth quantity of directions, selecting the first quantity of dimensions and the second quantity of directions of the Gabor filter;
wherein the first quantity of dimensions are 2 dimensions, and the second quantity of directions are 3 directions.

4. The image processing method according to claim 1, wherein the step of, based on the characteristic vectors and the grading values of the image data in the training set, training the random-forest classifier comprises:
by using a K-fold cross-validation mode, training the random-forest classifier;
wherein K represents K parts that the image data in the training set are divided into, and K is an integer greater than 0.

5. The image processing method according to claim 1, further comprising:
based on characteristic vectors and grading values of image data in a test set comprised in the dataset, checking the random-forest classifier that has been trained;
wherein the test set comprises a sixth quantity of the image data; and
the fifth quantity is greater than the sixth quantity.

6. The image processing method according to claim 1, wherein the categories of the image information include disgust, anger, calmness, delight and astonishment;
wherein the disgust corresponds to a grading value of 10-19, the anger corresponds to a grading value of 20-29, the calmness corresponds to a grading value of 30-39, the delight corresponds to a grading value of 40-49, and the astonishment corresponds to a grading value of 50-59.

7. The image processing method according to claim 6, wherein the step of, based on the predicted score value, determining the category of the image information of the image to be recognized comprises:
determining a threshold interval that the predicted score value of the image to be recognized falls into; and
according to the threshold interval that the predicted score value of the image to be recognized falls into, determining the category of the image information of the image to be recognized.

8. An image processing device, comprising:
a processor; and
a memory, wherein the memory stores one or more computer instructions, and the one or more computer instructions, when executed by the processor, causes the processor to perform operations of:
extracting a characteristic vector in an image to be recognized;
based on the characteristic vector of the image to be recognized, acquiring a predicted score value of the image to be recognized; and
based on the predicted score value, determining a category of an image information of the image to be recognized;
wherein the image to be recognized is a face image, and the image information is a facial expression;
wherein the operation of, based on the characteristic vector of the image to be recognized, acquiring the predicted score value of the image to be recognized comprises:
by using a random-forest classifier, based on the characteristic vector of the image to be recognized, acquiring the predicted score value of the image to be recognized; and
the operations further comprise:
based on characteristic vectors and grading values of image data in a training set comprised in a dataset, training the random-forest classifier;
wherein the dataset comprises the plurality of image data, and each of the image data is marked with a grading value;
the grading value of each of the image data is determined according to a category of image information comprised in the each of the image data, and different categories of the image information correspond to different grading values;
the image data are face-image data; and
the training set comprises a fifth quantity of the image data in the dataset.

9. A training method of a random-forest classifier, comprising:
based on characteristic vectors and grading values of image data in a training set comprised in a dataset, training the random-forest classifier;

wherein the dataset comprises the plurality of image data, and each of the plurality of image data is marked with a grading value;

the grading value of each of the image data is determined according to a category of image information comprised in the each of the image data, and different categories of the image information correspond to different grading values;

the image data are face-image data, and the image information is a facial expression; and the training set comprises a fifth quantity of the image data in the dataset.

10. The training method according to claim 9, wherein the step of, based on the characteristic vectors and the grading values of the image data in the training set, training the random-forest classifier comprises:

by using a K-fold cross-validation mode, training the random-forest classifier;

wherein K represents K parts that the image data in the training set are divided into, and K is an integer greater than 0.

11. The training method according to claim 10, further comprising:

based on characteristic vectors and grading values of image data in a test set comprised in the dataset, checking the random-forest classifier that has been trained;

wherein the test set comprises a sixth quantity of image data in the dataset; and the fifth quantity is greater than the sixth quantity.

12. The training method according to claim 9, wherein the categories of the image information include disgust, anger, calmness, delight and astonishment;

wherein the disgust corresponds to a grading value of 10-19, the anger corresponds to a grading value of 20-29, the calmness corresponds to a grading value of 30-39, the delight corresponds to a grading value of 40-49, and the astonishment corresponds to a grading value of 50-59.

13. A nonvolatile computer-readable storage medium, wherein the computer-readable storage medium stores a computer-readable instruction, and the computer-readable instruction, when executed by a computer, causes the computer to implement the image processing method according to claim 1.

14. The image processing device according to claim 8, wherein the one or more computer instructions, when executed by the processor, further causes the processor to perform operations of:

by using a Gabor filter, acquiring an image-feature response diagram of the image to be recognized; and extracting the characteristic vector of the image to be recognized from the image-feature response diagram;

wherein the Gabor filter comprises a first quantity of dimensions and a second quantity of directions;

the image-feature response diagram comprises features of the image information of the image to be recognized; and the first quantity of dimensions are less than 4 dimensions.

15. The image processing device according to claim 14, wherein the one or more computer instructions, when executed by the processor, further causes the processor to perform an operation of:

according to an accuracy rate of recognition of the image information by the Gabor filter with a third quantity of dimensions and a fourth quantity of directions, selecting the first quantity of dimensions and the second quantity of directions of the Gabor filter;

wherein the first quantity of dimensions are 2 dimensions, and the second quantity of directions are 3 directions.

16. The nonvolatile computer-readable storage medium according to claim 13, wherein the step of extracting the characteristic vector in the image to be recognized comprises:

by using a Gabor filter, acquiring an image-feature response diagram of the image to be recognized; and extracting the characteristic vector of the image to be recognized from the image-feature response diagram;

wherein the Gabor filter comprises a first quantity of dimensions and a second quantity of directions;

the image-feature response diagram comprises features of the image information of the image to be recognized; and the first quantity of dimensions are less than 4 dimensions.

* * * * *